UNITED STATES PATENT OFFICE.

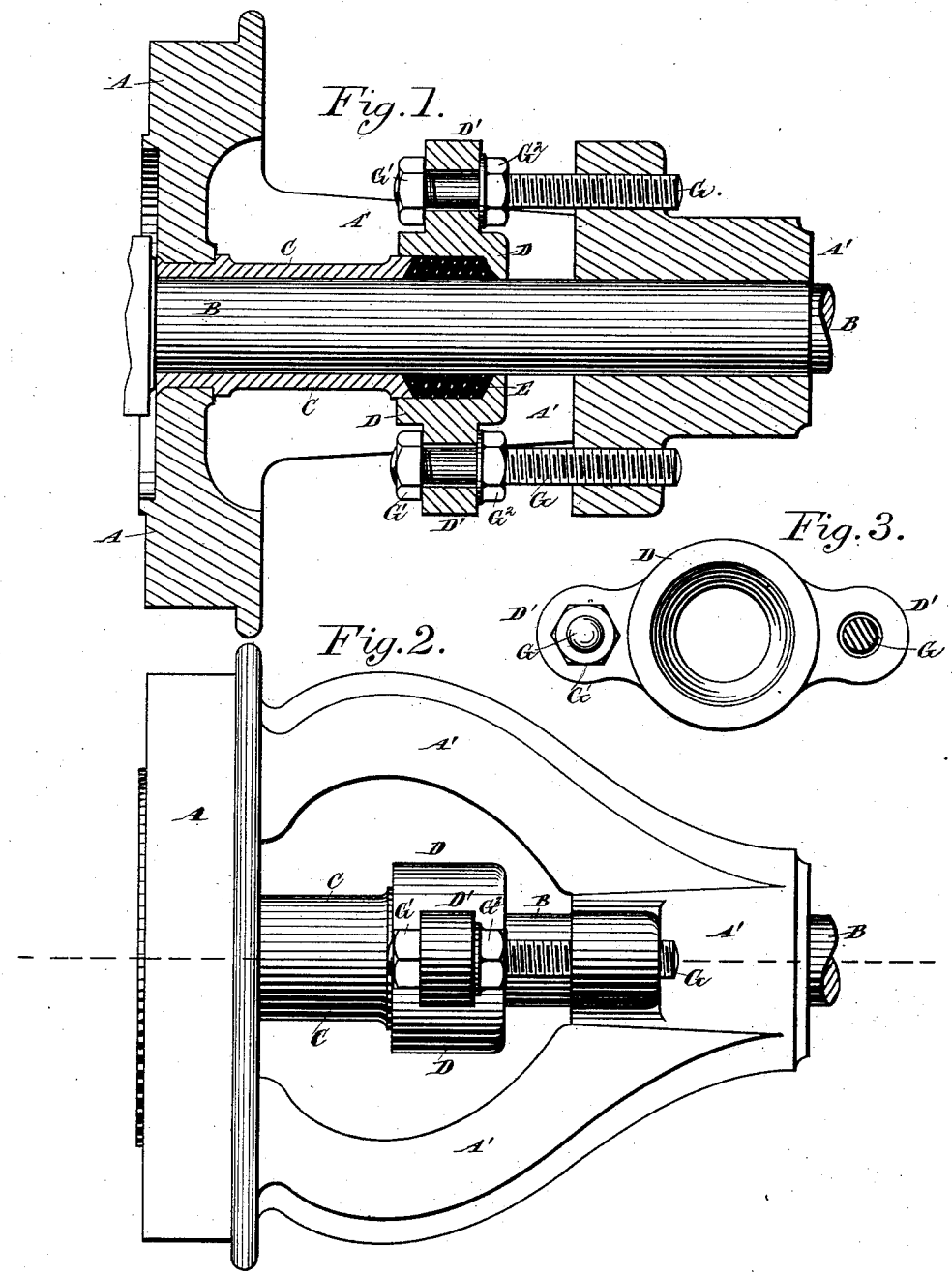

GEORGE H. CORLISS, OF PROVIDENCE, RHODE ISLAND.

STUFFING-BOX FOR STEAM-ENGINES.

SPECIFICATION forming part of Letters Patent No. 333,832, dated January 5, 1886.

Application filed June 13, 1885. Serial No. 168,593. (No model.)

*To all whom it may concern:*

Be it known that I, GEORGE H. CORLISS, a citizen of the United States, residing in the city and county of Providence, in the State of Rhode Island, have invented certain new and useful Improvements relating to Stuffing-Boxes for Steam-Engines, of which the following is a specification.

My improvement may apply to piston-rods as well as to valve-stems. It may serve with rods or stems which reciprocate or revolve or partially revolve. It may apply in any situation where there is or can be a yoke exterior to the stuffing-box, and through which the rod, shaft, or stem works. I compress a ring of yielding material, which may be packing of any ordinary or suitable character, and thereby maintain a tight joint around the valve-stem; but I reverse the relations of the parts and hold the packing in a position farther removed from the valve-chest than would be otherwise practicable. The packing is maintained in a cooler condition, and when any leakage occurs there is a larger admixture of water, thereby securing more durability to the packing.

The accompanying drawings form a part of this specification, and represent what I consider the best means of carrying out the invention as applied to the stem of a circular sliding valve, generally known as a "Corliss" valve.

Figure 1 is a central horizontal section showing the stuffing-box and the adjacent parts. Fig. 2 is a corresponding plan view. Fig. 3 is an end view of one of the parts.

Similar letters of reference indicate corresponding parts in all the figures where they occur.

A is a casting, which, though adapted to be removed when desired, forms when in position a portion of the fixed work of the engine.

A' is a yoke cast in one with A, and serving as an outer bearing for the valve-stem B. It will be understood that this valve-stem connects at the inner end with the valve, (not fully represented,) and at its outer end is provided with an arm, (not shown,) through which it receives from the engine the proper vibratory motion.

C is a sleeve, of brass or other non-corrosive metal, rigidly set in the casting A, inclosing the valve-stem B, and extending out, as shown.

D is an adjustable stuffing-box, which partially receives the outer end of the sleeve C. The remaining portion of this cavity is occupied by any ordinary fibrous, metallic, or other suitable packing, E, adapted to be confined, when necessary, by moving the stuffing-box D inward toward the valve to a greater or less extent.

G are studs set in the yoke A', and extending through lugs D' on the stuffing-box D. For convenience in applying and operating the studs the heads $G^2$ are preferably set fixedly on the studs at a short distance from one end, and the adjustment is effected by these heads, operated as required in the obvious manner, and the stuffing-box D is secured at the desired point by the jam-nuts G'.

To introduce new packing, the stuffing-box D is shifted outward until it strikes the inner surface of the yoke A'. This opens a sufficient space between it and the sleeve C to allow packing to be easily introduced. On moving the stuffing-box D inward and receiving the sleeve C to compress the packing the adjustment by the heads $G^2$ allows the packing to be compressed with any required degree of force. This arrangement, by removing the stuffing box or gland some distance from the heat of the steam-chest, thereby affording more surface for the radiation of heat from and consequent condensation of steam within the sleeve C, maintains the packing in a cooler and better condition than the ordinary stuffing-box, is easy of access and adjustment, and insures that when there is a slight leakage around the stem B the leakage consists of a large admixture of water, and the lubrication better with that water than with steam.

Modifications may be made in the forms and proportions without departing from the principle or sacrificing the advantages of the invention.

The sleeve C may be held to the part A by other means than the collar and riveting shown. It may be made in one with the casting A.

Other means than the studs G, check-nuts G', and heads $G^2$ may be employed to move the stuffing-box B.

I claim as my invention—

1. The combination, with the rod or stem B, of the fixed head A, the long sleeve C, fixed rigidly therein, and adjustable stuffing-box D and inclosed packing E, all arranged for joint operation as herein specified.

2. The fixed portion A, with its yoke A', studs G, check-nuts G', and heads G², in combination with each other and with the stem B, stuffing-box D, and sleeve C, adapted for joint operation as herein specified.

In testimony whereof I have hereunto set my hand, at Providence, Rhode Island, this 2d day of June, 1885, in the presence of two subscribing witnesses.

GEORGE H. CORLISS.

Witnesses:
 HENRY MARSH, Jr.,
 WILLIAM B. SHERMAN.